United States Patent Office 2,698,869
Patented Jan. 4, 1955

2,698,869

DEALKYLATION OF MONOMETHYL NAPHTHALENE

Stanford J. Hetzel, Cheltenham, Pa., assignor to Sun Oil Company, Philadelphia, Pa., a corporation of New Jersey No Drawing. Application March 12, 1953,
Serial No. 342,037

8 Claims. (Cl. 260—672)

This invention relates to the dealkylation of monomethyl naphthalenes to form naphthalene as the primary reaction product.

I have discovered that a monomethyl naphthalene may be dealkylated to naphthalene by contacting it at an elevated temperature with a contact mass comprising a micro-porous siliceous material and nickel in the presence of hydrogen or a hydrogen donor for a time sufficient to cause the dealkylation to occur to a desired extent. Cobalt may be substituted for nickel in such compositions. The undesirable features of using nickel or cobalt alone for dealkylation, such as ease of poisoning and formation of undesired products, are avoided by using a microporous siliceous material in association with nickel or cobalt.

The starting material for the reaction of the invention may comprise a mixture of the alpha and beta isomers of monomethyl naphthalene, or it may comprise either isomer in concentrated form. The monomethyl naphthalenes may be contained in a hydrocarbon fraction, such as a catalytic gas oil fraction, preferably a fraction or like hydrocarbon mixture containing the monomethyl naphthalenes in fairly substantial concentration. Such a fraction may be pretreated to avoid poisoning of the contact mass or other undesirable effects. Also, the fraction may be pretreated to concentrate the dicyclic aromatics therein or even to separate the monomethyl naphthalenes therefrom.

The rate at which the monomethyl naphthalenes are charged to the reaction is preferably about one gram/ minute/100 grams of contact mass. Satisfactory results have been obtained using rates within the range 0.1–10 grams/minute/100 grams of contact mass. Other charging rates are not excluded from the scope of the invention.

It is preferred to use pressures within the range from atmospheric pressure to about 150 p. s. i. g. Pressures above 150 p. s. i. g. are avoided in order to minimize the possibility of substantial hydrogenation of the aromatic rings in reactants or products. This pressure is obtained and maintained with hydrogen gas which acts to convert the methyl radical to methane as the dealkylation proceeds and to suppress the formation of carbonaceous materials. It will be understood that in place of at least part of the hydrogen which is added to the system, refinery gases or other gases supplying hydrogen may be used.

The reaction temperature should be within the range between about 450° C. and about 750° C. Preferably, the reaction temperature is not above 640° C., since higher temperatures tend to result in deposition of carbonaceous materials on the catalyst. Also, the reaction temperature is preferably above 560° C. in order to obtain particularly high yields of naphthalene.

Contact masses which are suitable for use in the invention include those which are composed of a major proportion of the micro-porous siliceous material, silica gel, and a minor proportion of nickel or cobalt.

Macro-porous or compact siliceous or silicon-containing materials have been found to be unsuitable for use in the invention. Such compact materials include filter stone and silicon carbide.

Catalysts for use according to the invention may be prepared by impregnating silica gel particles with an aqueous solution of salts of the respective metals, drying the particles, igniting to decompose the salts, and reducing the nickel or cobalt oxides in situ to the metallic state. Preferably the catalyst used according to the invention contains 90–99.5% silica gel and 0.5–10% nickel or cobalt.

The following example illustrates the invention. A dealkylation of monomethyl naphthalene according to the invention and a dealkylation of monomethyl naphthalene with another catalyst, for purposes of comparison, were carried out according to a common procedure; a stream of monomethyl naphthalene charge at a measured rate was admixed with hydrogen at a measured pressure of 50 p. s. i. g. and passed through a tube having an internal volume of about 200 cubic centimeters and containing about 100 grams of the contact mass heated to the reaction temperature of 600° C. The hydrogen was preheated to a temperature about 100° C. less than the reaction temperature and charged to the tube at a rate of about one liter per minute. Other ways of conducting the reaction are not excluded from the scope of the invention.

In run No. 1 in the following table, the contact mass was a catalyst consisting of 95% silica gel on which 5% nickel had been deposited, and in run No. 2, the contact mass was a catalyst consisting of 90% silica gel on which 5% nickel and 5% alumina had been deposited. In run No. 1, the hydrocarbon charge material contained 3.9% naphthalene, 40.7% alpha-methyl naphthalene, and 55.4% beta-methyl naphthalene respectively. In run No. 2, the corresponding contents of the components were 1.3, 87.4, and 11.3% respectively. The hydrocarbon percolation rates in runs 1 and 2 were 1.05 and 1.16 grams of hydrocarbon per minute per 100 grams of catalyst respectively.

| Run No. | Catalyst | Product Yields in Percent | | | | | |
|---|---|---|---|---|---|---|---|
| | | Naph-thalene | Mono-cyclic Com-pounds | Gas | Polymer | Carbo-naceous Deposits | Unre-acted |
| 1 | SiO₂:Ni(95:5) | 23.1 | 2.9 | ¹18.5 | 0 | | 55.5 |
| 2 | SiO₂:Al₂O₃:Ni(90:5:5) | 11.8 | 1.1 | 12.0 | 6.4 | 0.4 | 68.3 |

¹ Includes percent carbonaceous deposits formed.

This example shows that the catalyst according to the invention, as used in run 1, produces a 23.1% yield of naphthalene, or a net increase of 19.2% over the original naphthalene content (3.9%) of the charge material, whereas a catalyst containing alumina in addition to silica gel and nickel produces an 11.8% yield, or a net increase of only 10.5% over the original naphthalene content (1.3%) of the charge material used in run 2.

These runs were conducted without preheating of the hydrocarbon charge. If the charge is preheated, at a given hydrocarbon rate, the charge is at the reaction temperature for a greater portion of its time of residence in the tube, and higher yields can be obtained. Higher yields can also be obtained by separating the unreacted portion of the product and recycling it for further treatment.

The lowest boiling liquid fraction obtained comprises monocyclic compounds formed by rupture of the naphthalene ring. These include 1.2-dimethyl-3-ethyl benzene, 1-methyl-4-ethyl benzene, and very small amounts of benzene, toluene, mesitylene, and 1,4-diethylbenzene.

The gases obtained are mostly methane and uncombined hydrogen. The residue remaining after the naphthalene and monomethyl naphthalene portions of the reaction products have been removed comprises polymeric materials. The amounts of carbon deposited are, under most of the reaction conditions used, quite small.

This application is a continuation-in-part of my co-pending application Serial No. 82,917, filed March 22, 1949, and now abandoned.

The invention claimed is:

1. The method of dealkylating a monomethyl naphthalene to form naphthalene which comprises contacting said monomethyl naphthalene at a temperature within the range 450° C.–750° C. in the presence of hydrogen with a contact mass consisting essentially of a major proportion of silica gel and a minor proportion, within the approximate range 0.5 to 10 percent, of material selected from the group consisting of nickel and cobalt.

2. Method according to claim 1 wherein the contact mass consists essentially of 90–99.5% silica gel and 0.5–10% nickel.

3. Method according to claim 2 wherein the contact mass consists essentially of about 95% silica gel and about 5% nickel.

4. The method of dealkylating a monomethyl naphthalene to form naphthalene which comprises contacting said monomethyl naphthalene at a rate within the range 0.1–10 grams per minute per 100 grams of contact mass and at a temperature within the range 560° C. to 640° C. in the presence of hydrogen at a pressure within the range atmospheric–150 pounds per square inch gauge with a contact mass consisting essentially of a major proportion of silica gel and a minor proportion within the approximate range 0.5 to 10 percent of material selected from the group consisting of nickel and cobalt.

5. Method according to claim 4 wherein the contact mass consists essentially of 90–99.5% silica gel and 0.5–10% nickel.

6. Method according to claim 5 wherein the contact mass consists essentially of about 95% silica gel and about 5% nickel.

7. The method of dealkylating a monomethyl naphthalene to form naphthalene which comprises contacting said monomethyl naphthalene at a temperature within the range 560° C.–640° C. in the presence of hydrogen with a contact mass consisting essentially of a major proportion of silica gel and a minor proportion, within the approximate range 0.5 to 10 percent, of material selected from the group consisting of nickel and cobalt.

8. The method of dealkylating a monomethyl naphthalene to form naphthalene which comprises contacting said monomethyl naphthalene at a temperature of about 600° C. in the presence of hydrogen with a contact mass consisting essentially of a major proportion of silica gel and a minor proportion, within the approximate range 0.5 to 10 percent, of material selected from the group consisting of nickel and cobalt.

References Cited in the file of this patent

UNITED STATES PATENTS

| | | |
|---|---|---|
| 2,194,449 | Sachanen et al. | Mar. 19, 1940 |
| 2,422,673 | Haensel et al. | June 24, 1947 |
| 2,470,712 | Montgomery et al. | May 17, 1949 |